United States Patent
Arnold et al.

(10) Patent No.: US 11,263,188 B2
(45) Date of Patent: Mar. 1, 2022

(54) GENERATION AND MANAGEMENT OF AN ARTIFICIAL INTELLIGENCE (AI) MODEL DOCUMENTATION THROUGHOUT ITS LIFE CYCLE

(71) Applicant: International Business Machines Corporation, Armonk, NY (US)

(72) Inventors: Matthew R. Arnold, Ridgefield Park, NJ (US); Rachel K. E. Bellamy, Bedford, NY (US); Kaoutar El Maghraoui, Yorktown Heights, NY (US); Michael Hind, Cortlandt Manor, NY (US); Stephanie Houde, Belmont, MA (US); Kalapriya Kannan, Bangalore (IN); Sameep Mehta, Bangalore (IN); Aleksandra Mojsilovic, New York, NY (US); Ramya Raghavendra, New York, NY (US); Darrell C. Reimer, Tarrytown, NY (US); John T. Richards, Honeoye Falls, NY (US); David J. Piorkowski, White Plains, NY (US); Jason Tsay, White Plains, NY (US); Kush R. Varshney, Ossining, NY (US); Manish Kesarwani, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 293 days.

(21) Appl. No.: 16/672,312

(22) Filed: Nov. 1, 2019

(65) Prior Publication Data
US 2021/0133162 A1   May 6, 2021

(51) Int. Cl.
*G06F 16/21* (2019.01)
*G06N 20/00* (2019.01)

(52) U.S. Cl.
CPC .......... *G06F 16/212* (2019.01); *G06N 20/00* (2019.01)

(58) Field of Classification Search
CPC ........ G06F 16/212; G06F 40/295; G06F 8/73; G06F 16/254; G06F 8/10; G06F 8/33;
(Continued)

(56) References Cited

U.S. PATENT DOCUMENTS

| | | |
|---|---|---|
| 6,671,874 B1 | 12/2003 | Passova |
| 7,885,793 B2 | 2/2011 | Padmanabhan |

(Continued)

FOREIGN PATENT DOCUMENTS

CN    108089842 A    5/2018

OTHER PUBLICATIONS

Mell et al., "The NIST Definition of Cloud Computing," National Institute of Standards and Technology Special Publication 800-145, Sep. 2011, 7 pages.

(Continued)

*Primary Examiner* — Evan Aspinwall
(74) *Attorney, Agent, or Firm* — Sherman IP LLP; Kenneth L. Sherman; Steven Laut

(57) ABSTRACT

A method for automatically generating documentation for an artificial intelligence model includes receiving, by a computing device, an artificial intelligence model. The computing device accesses a model facts policy that indicates data to be collected for artificial intelligence models. The computing device collects artificial intelligence model facts regarding the artificial intelligence model according to the model facts policy. The computing device accesses a factsheet template. The factsheet template provides a schema for an artificial intelligence model factsheet for the artificial intelligence model. The computing device populates the artificial intelligence model factsheet using the factsheet (Continued)

template with the artificial intelligence model facts related to the artificial intelligence model.

20 Claims, 14 Drawing Sheets

(58) Field of Classification Search
CPC . G06F 8/70; G06N 20/00; G06N 5/02; G06N 5/025; G06N 3/08; G06N 5/022; G06Q 40/025; G06Q 10/0633
USPC .......................................................... 707/804
See application file for complete search history.

(56) References Cited

U.S. PATENT DOCUMENTS

| | | | |
|---|---|---|---|
| 7,970,795 B2 | 6/2011 | Kemp et al. | |
| 8,019,710 B1 | 9/2011 | Heidenreich et al. | |
| 2007/0016542 A1* | 1/2007 | Rosauer | G06N 5/022 706/21 |
| 2008/0234850 A1 | 9/2008 | Bowling | |
| 2016/0055427 A1 | 2/2016 | Adjaoute | |
| 2019/0034199 A1* | 1/2019 | Pollock | G06F 8/73 |
| 2019/0147104 A1* | 5/2019 | Wu | G10L 15/22 707/737 |
| 2019/0340518 A1* | 11/2019 | Merrill | G06F 16/908 |
| 2020/0334151 A1* | 10/2020 | Soini | G06F 12/0888 |

OTHER PUBLICATIONS

Wikipedia, "Comparison of documentation generators," downloaded from: https://en.Wikipedia.org/wiki/Comparison_of_documentation_generators, downloaded Nov. 1, 2019, 12 pages, United States.

University of Missouri-Kansas-City, "Software Project Documentation", downloaded: http://sce2.umkc.edu/BIT/burrise/ol/appendix/Software_Documentation_Templates/, downloaded Nov. 1, 2019, 4 pages, United States.

Wikipedia, "Document management system", downloaded: https://en.wikipedia.org/wiki/Document_management_system, downloaded Nov. 1, 2019, 8 pages, United States.

Wikipedia, "Document Automation," downloaded: https://en.wikipedia.org/wiki/Document_automation, downloaded Nov. 1, 2019, 4 pages, United States.

Wikipedia, "Technical data management system", downloaded: https://en.wikipedia.org/wiki/Technical_data_management_system, downloaded Nov. 1, 2019, 8 pages, United States.

IBM, "AutoAI with IBM Watson Studio", downloaded: https://www.ibm.com/cloud/watson-studio/autoai, downloaded Nov. 1, 2019, 11 pages, United States.

* cited by examiner

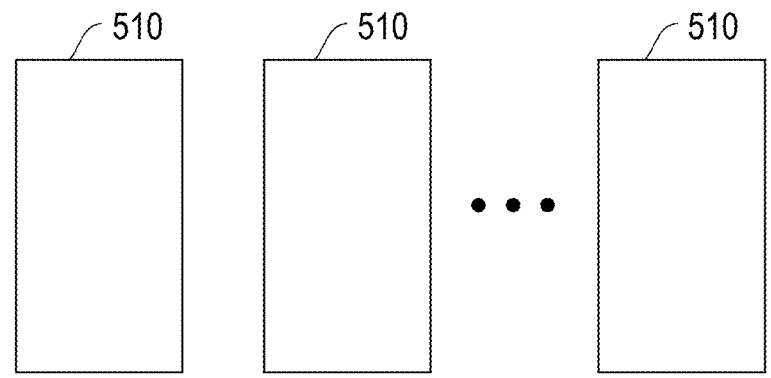
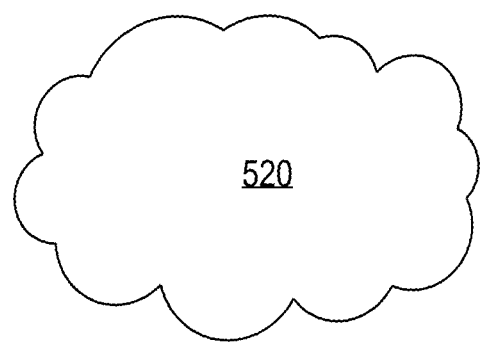
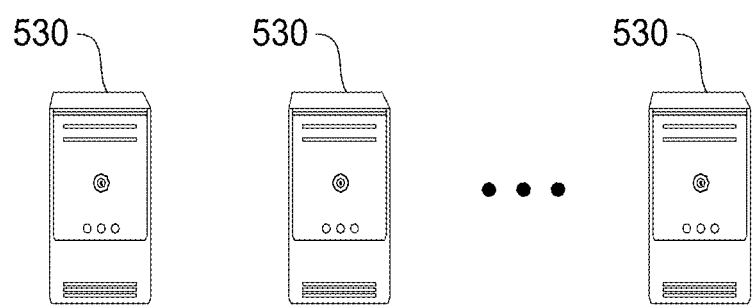
FIG. 5

FactSheet Template           <u>641</u>
Intended use
Model criticality: (high, med, low)
------------------
Dataset info: size, demographic attributes, distribution information on all features
Model info: evaluation metrics
------------------
Verification results: coverage (pct of time model is used)
Pre-guardrail %: model not used because features indicate bad candidate for model
Post-guardrail %: model not used because it has low confidence
Platform deployment info: where deployed, dependent infrastructure, etc.
------------------
Validation results: model metrics, coverage, etc.
------------------
KPIs: Loan accept rate; processing time; avg profit
Compliance metrics definition: disparate impact between race groups < 20%; disparate impact between gender groups < 20%
Model performance metrics: interest rate prediction error

FIG. 7

FactSheet                  651
- Intended use: assist bank loan managers in determining creditworthiness of an individual for a loan
- Model criticality: High (AI driven approval service affects all loans)

Dataset info:
- Training dataset
- size (70,615),
- demographic attributes (gender, age, sex),
- annual income:
- mean (72,196),
- min (4,000),
- max (2,039,784),
- stdDev (48,920),
- etc.
- Test dataset
- size (30,263),
- demographic attributes (gender, age, sex),
- annual income:
- ....

Model Info
- Interest Rate Prediction Error (1.992) [root mean squared error]

Verification results
- Coverage: 82%
- Non-coverage breakdown:
- pre-guardrail: 35%
- post-guardrail: 65%

Platform deployment details & dependencies
- deployed in ICP, using Kubeflow, and Object store

Validation results
- Interest Rate Prediction Error: 1.992
- Coverage: 82%
- Non-coverage breakdown:
- pre-guardrail: 35%
- post-guardrail: 65%

KPIs
- Loan Accept Rate: 73.2%
- Processing Time: 3.2hrs
- Avg Profit: $278

Compliance metrics
- Disparate impact:
- race: 16%;
- gender: 5%

Model performance metrics
- Interest rate prediction error: 3%

FIG. 8

GENERATION AND MANAGEMENT OF AN ARTIFICIAL INTELLIGENCE (AI) MODEL DOCUMENTATION THROUGHOUT ITS LIFE CYCLE

BACKGROUND

The field of embodiments of the present invention relate to generation and management of artificial intelligence (AI) model documentation throughout its life cycle.

Building an AI system typically involves many stages and requires collaboration between various personas (who do not generally share a common vocabulary) throughout its lifecycle: data scientists, application developers, test engineers, devops engineers, product managers, regulators, etc. Documenting the work that occurs within each of these stages is key to providing transparency, trust, and regulatory compliance to the entire process.

Today, documenting an AI system is a very costly, manual, and inconsistent process that requires many days/weeks/months of labor to gather and stitch information (if still available) from multiple parties.

One problem is that there is a lack of standard practices and methodologies to document how an AI system was created, trained, tested, deployed, and evaluated; how it should operate; and how it should (and should not) be used.

Another problem is that there is no structured way to represent model facts, store these model facts, and manage the model facts as the model is being built, tuned, deployed, tested, monitored, and improved.

SUMMARY

Embodiments relate to generation and management of artificial intelligence (AI) model documentation throughout the model's life cycle.

One embodiment provides a method for automatically generating documentation for an artificial intelligence model includes receiving, by a computing device, an artificial intelligence model. The computing device accesses a model facts policy that indicates data to be collected for artificial intelligence models. The computing device collects artificial intelligence model facts regarding the artificial intelligence model according to the model facts policy. The computing device accesses a factsheet template. The factsheet template provides a schema for an artificial intelligence model factsheet for the artificial intelligence model. The computing device populates the artificial intelligence model factsheet using the factsheet template with the artificial intelligence model facts related to the artificial intelligence model. Other embodiments include a computer program product for automatically generating documentation for an artificial intelligence model, and an apparatus including a memory for storing instructions and a processor configured to execute the instructions. These features contribute to the advantage of providing a structure for generation and management of AI model documentation from various collaborative sources during the life cycle of an AI model and application. Other advantages include providing a consistent process for automatic documenting of an AI system, an AI application and AI models during multiple stages in the life cycle of building AI models and applications.

One or more of the following features may be included. In some embodiments, the artificial intelligence model is present within an artificial intelligence application.

In some embodiments, the indicated data of the model facts policy specifies the artificial intelligence model facts that are collected as the artificial intelligence model is being built, tested, deployed, and monitored in a machine learning workflow.

In some embodiments, the artificial intelligence model facts are generated from tasks in the machine learning workflow.

In some embodiments, the artificial intelligence model facts comprise information about the data and transformations, training protocols, algorithmics and optimizations, model performance metrics, lineage, and information as to how the artificial intelligence model is being operated in production.

In some embodiments, the method may further include accessing, by the computing device, a factsheet palette, the factsheet palette defining elements that are selectable and combinable into the factsheet template.

In some embodiments, a factsheet template builder builds the factsheet template using information from a plurality of sources that is collected using the artificial intelligence model facts policy and the factsheet palette.

These and other features, aspects and advantages of the present embodiments will become understood with reference to the following description, appended claims and accompanying figures.

BRIEF DESCRIPTION OF THE DRAWINGS

FIG. 5 is a block diagram illustrating a distributed system for generation and management of AI model documentation, according to one embodiment;

FIG. 7 illustrates an example factsheet template, according to one embodiment;

FIG. 8 illustrates an example factsheet, according to one embodiment;

DETAILED DESCRIPTION

Figure 1:
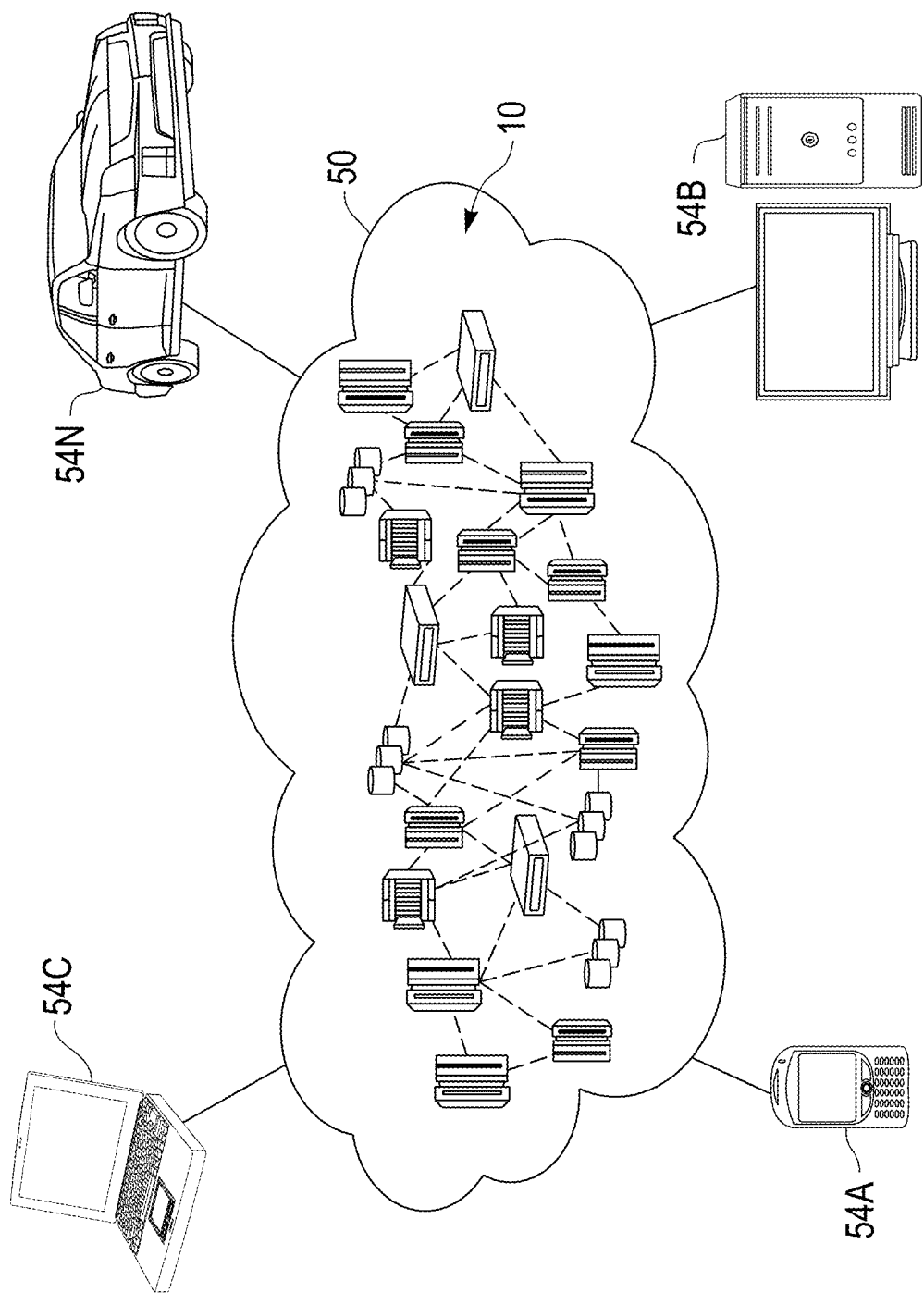
FIG. 1 depicts a cloud computing environment, according to an embodiment.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments relate to generation and management of artificial intelligence (AI) model documentation throughout the model's life cycle. One embodiment provides a method for automatically generating documentation for an artificial intelligence model. The method may include receiving, by a computing device, an artificial intelligence model. The method may also include that the computing device accesses a model facts policy that indicates data to be collected for artificial intelligence models. The method may further include that the computing device collects artificial intelligence model facts regarding the artificial intelligence model according to the model facts policy. The method may also include that the computing device accesses a factsheet template. The method may further include that the factsheet template provides a schema for an artificial intelligence model factsheet for the artificial intelligence model. The method may also include that the computing device populates the artificial intelligence model factsheet using the factsheet template with the artificial intelligence model facts related to the artificial intelligence model. The illustrative embodiments used to describe the invention generally address and solve the above-described problems and other problems related to performing generation and management of AI model documentation throughout the model's life cycle.

It is understood in advance that although this disclosure includes a detailed description of cloud computing, implementation of the teachings recited herein are not limited to a cloud computing environment. Rather, embodiments of the present embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.

Service Models are as follows:

Software as a Service (SaaS): the capability provided to the consumer is the ability to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Referring now to FIG. 1, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
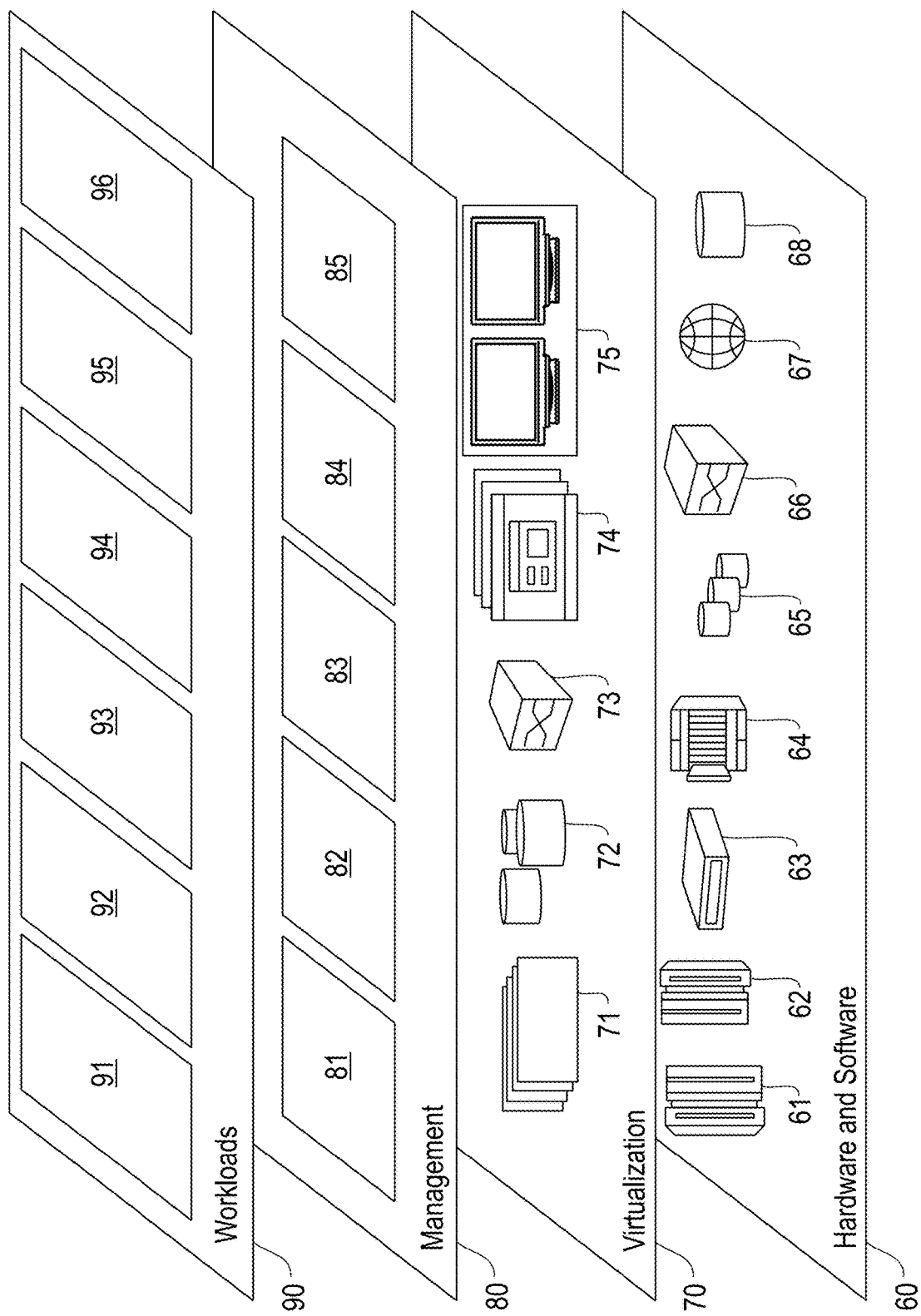
FIG. 2 depicts a set of abstraction model layers, according to an embodiment.

Referring now to FIG. 2, a set of functional abstraction layers provided by the cloud computing environment 50 (FIG. 1) is shown. It should be understood in advance that the components, layers, and functions shown in FIG. 2 are intended to be illustrative only and embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, a management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment and billing or invoicing for consumption of these resources. In one example, these resources may comprise application software licenses. Security provides identity verification for cloud consumers and tasks as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and generation and management of AI model documentation processing 96 (see, e.g., system 500, FIG. 5, process 1400, FIG. 14). As mentioned above, all of the foregoing examples described with respect to FIG. 2 are illustrative only, and the embodiments are not limited to these examples.

It is reiterated that although this disclosure includes a detailed description on cloud computing, implementation of the teachings recited herein are not limited to a cloud computing environment. Rather, the embodiments may be implemented with any type of clustered computing environment now known or later developed.

Figure 3:
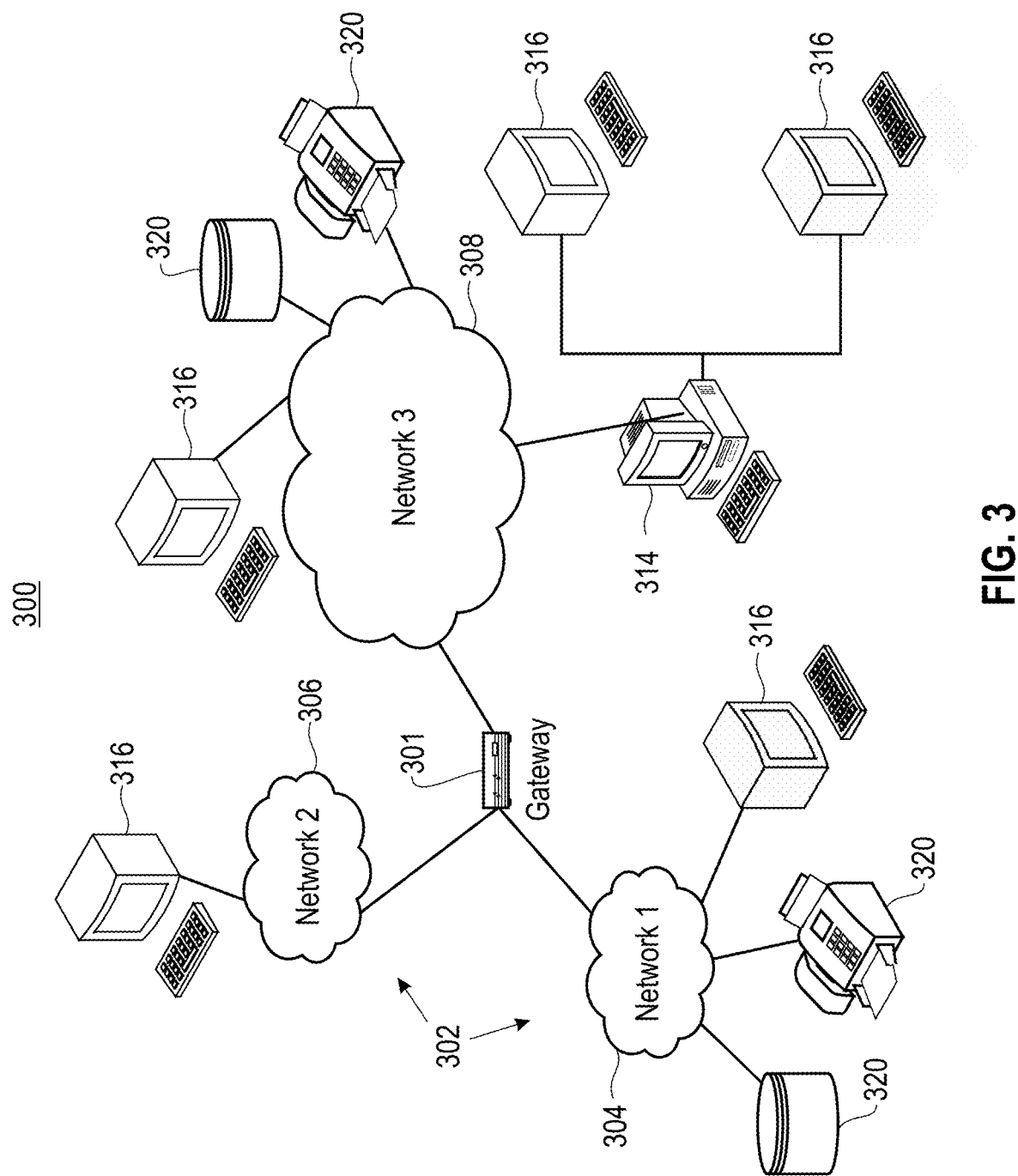
FIG. 3 is a network architecture of a system for generation and management of artificial intelligence (AI) model documentation processing, according to an embodiment.

FIG. 3 is a network architecture of a system 300 for generation and management of AI model documentation processing, according to an embodiment. As shown in FIG. 3, a plurality of remote networks 302 are provided, including a first remote network 304 and a second remote network 306. A gateway 301 may be coupled between the remote networks 302 and a proximate network 308. In the context of the present network architecture 300, the networks 304, 306 may each take any form including, but not limited to, a LAN, a WAN, such as the Internet, public switched telephone network (PSTN), internal telephone network, etc.

In use, the gateway 301 serves as an entrance point from the remote networks 302 to the proximate network 308. As such, the gateway 301 may function as a router, which is capable of directing a given packet of data that arrives at the gateway 301, and a switch, which furnishes the actual path in and out of the gateway 301 for a given packet.

Further included is at least one data server 314 coupled to the proximate network 308, which is accessible from the remote networks 302 via the gateway 301. It should be noted that the data server(s) 314 may include any type of computing device/groupware. Coupled to each data server 314 is a plurality of user devices 316. Such user devices 316 may include a desktop computer, laptop computer, handheld computer, printer, and/or any other type of logic-containing device. It should be noted that a user device 316 may also be directly coupled to any of the networks in some embodiments.

A peripheral 320 or series of peripherals 320, e.g., facsimile machines, printers, scanners, hard disk drives, networked and/or local storage units or systems, etc., may be coupled to one or more of the networks 304, 306, 308. It should be noted that databases and/or additional components may be utilized with, or integrated into, any type of network element coupled to the networks 304, 306, 308. In the context of the present description, a network element may refer to any component of a network.

According to some approaches, methods and systems described herein may be implemented with and/or on virtual systems and/or systems, which emulate one or more other systems, such as a UNIX system that emulates an IBM z/OS environment, a UNIX system that virtually hosts a MICROSOFT WINDOWS environment, a MICROSOFT WINDOWS system that emulates an IBM z/OS environment, etc. This virtualization and/or emulation may be implemented through the use of VMWARE software in some embodiments.

Figure 4:
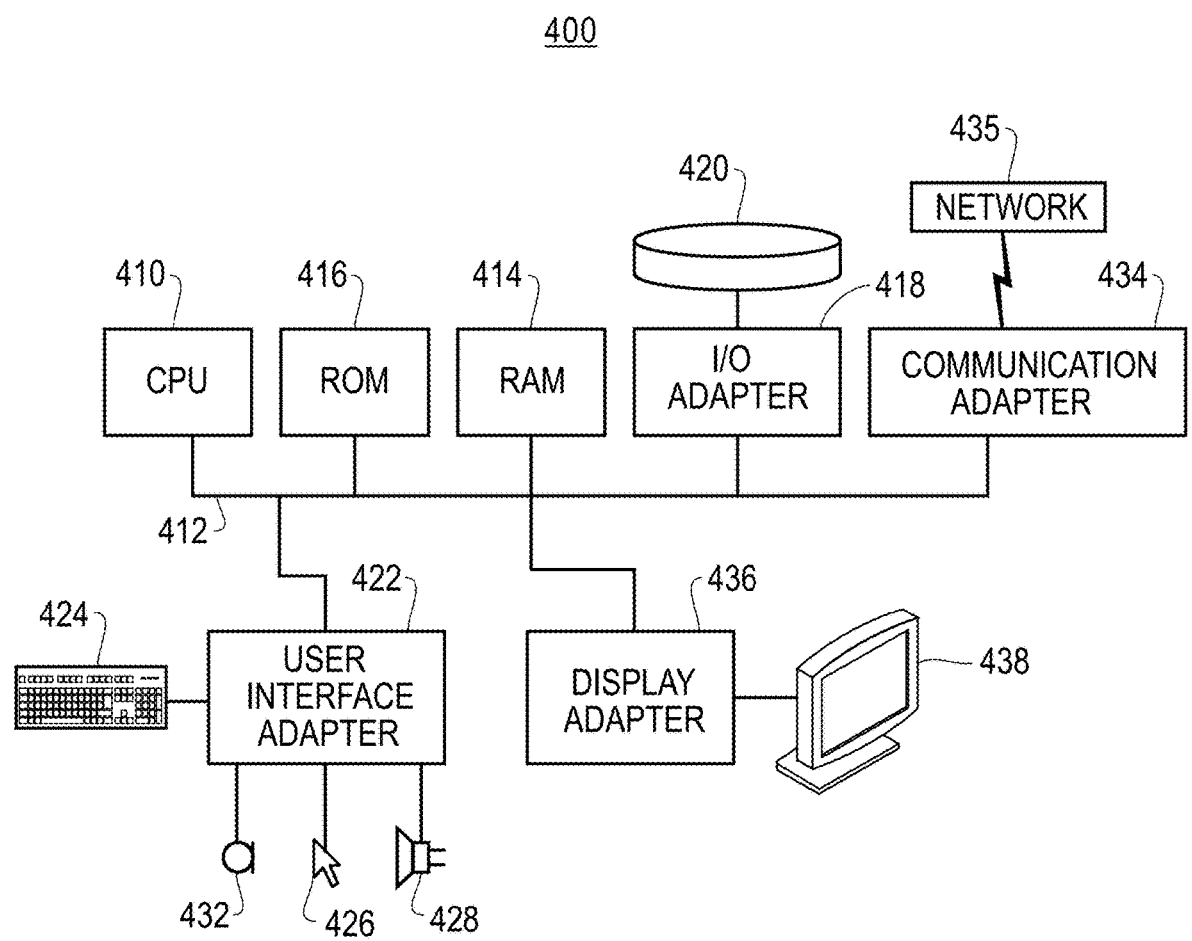
FIG. 4 shows a representative hardware environment that may be associated with the servers and/or clients of FIG. 1, according to an embodiment.

FIG. 4 shows a representative hardware system 400 environment associated with a user device 316 and/or server 314 of FIG. 3, in accordance with one embodiment. In one example, a hardware configuration includes a workstation having a central processing unit 410, such as a microprocessor, and a number of other units interconnected via a system bus 412. The workstation shown in FIG. 4 may include a Random Access Memory (RAM) 414, Read Only Memory (ROM) 416, an I/O adapter 418 for connecting peripheral devices, such as disk storage units 420 to the bus 412, a user interface adapter 422 for connecting a keyboard 424, a mouse 426, a speaker 428, a microphone 432, and/or other user interface devices, such as a touch screen, a digital camera (not shown), etc., to the bus 412, communication adapter 434 for connecting the workstation to a communication network 435 (e.g., a data processing network) and a display adapter 436 for connecting the bus 412 to a display device 438.

In one example, the workstation may have resident thereon an operating system, such as the MICROSOFT WINDOWS Operating System (OS), a MAC OS, a UNIX OS, etc. In one embodiment, the system 400 employs a POSIX® based file system. It will be appreciated that other examples may also be implemented on platforms and operating systems other than those mentioned. Such other examples may include operating systems written using JAVA, XML, C, and/or C++ language, or other programming languages, along with an object oriented programming methodology. Object oriented programming (OOP), which has become increasingly used to develop complex applications, may also be used.

FIG. 5 is a block diagram illustrating a distributed system 500 that may be employed for generation and management of AI model documentation processing, according to one embodiment. In one embodiment, the system 500 includes client devices 510 (e.g., mobile devices, smart devices, computing systems, etc.), a cloud or resource sharing environment 520 (e.g., a public cloud computing environment, a private cloud computing environment, a data center, etc.), and servers 530. In one embodiment, the client devices 510 are provided with cloud services from the servers 530 through the cloud or resource sharing environment 520.

Figure 6:
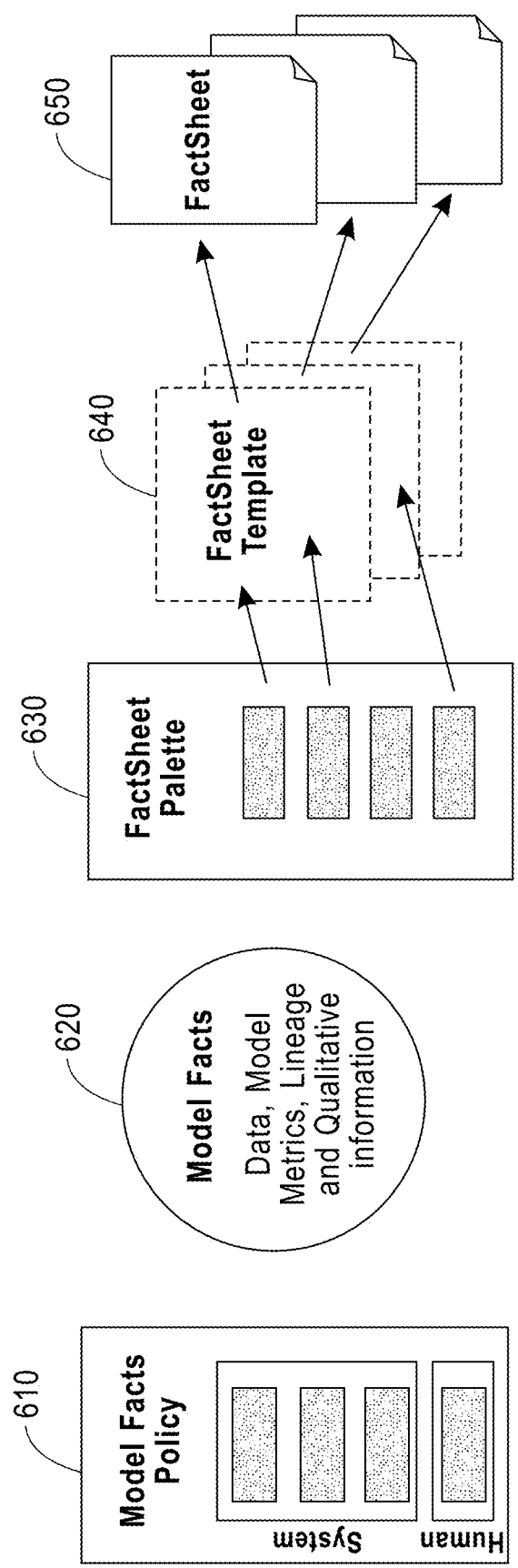
FIG. 6 illustrates example elements of an exemplar factsheet processing system, according to an embodiment.

FIG. 6 illustrates example elements of an exemplar factsheet processing system (e.g., a computing device from computing node 10, FIG. 1, hardware and software layer 60, FIG. 2, processing system 300, FIG. 3, system 400, FIG. 4, system 500, FIG. 5, etc.)), according to an embodiment. In one embodiment, model facts policy 610 defines which model facts 620, including information and metrics, for AI model(s) or application(s) that are to be collected and optionally how and where they are sourced along with any constraints including acceptable ranges. A model facts policy 610 is defined to specify which model facts 620 need to be collected. The policies in the factsheet policy 610 determine which model facts 620 are collected as the AI model is being built, tested, deployed, and monitored in a machine learning (ML) workflow that includes, for example, ground truth gathering, data cleansing, data engineering, model selection, parameter optimization, ensemble, model validation, model deployment, runtime monitoring, model improvement, etc. In one embodiment, the factsheet policy 610 may be manually generated or automatically generated based on ML applications, AI, etc. The features regarding the model facts policy 610 contribute to the advantage of providing consistent and standard practices and methodologies, and a structure for generation and management of AI model documentation from various collaborative sources.

In one embodiment, model facts 620 include all information that is collected about an AI model or application, as governed by the model facts policy 610, including information about data and transformations, training protocols, algorithmics and optimizations, model performance metrics, lineage, and how the model is being operated in production. Model facts 620 begin to be gathered/collected when an AI model is first created (which is generally due to an action in a development tool to create/name a model under development).

In one embodiment, the model facts 620 includes both automatic and manually-authored information.

In one embodiment, the model facts 620 are generated from many commonly known tasks in a machine learning (ML) workflow, such as ground truth gathering, data cleansing, data engineering, model selection, parameter optimization, ensemble, model validation, model deployment, runtime monitoring, model improvement, etc. In one embodiment, the model facts 620 are generated by aggregating the model facts 620 from various sources during the life cycle of an AI model.

In one embodiment, a factsheet palette 630 defines the elements that can be selected and combined into a factsheet template 640. The factsheet palette 630 may optionally group related model facts 620 together such as data schema, data properties, evaluation metrics, performance metrics, explainability metrics, bias metrics, business key performance indicators (KPIs), etc., that can be combined as required for particular stakeholders into one or more factsheet templates 640. The features regarding the factsheet palette 630 contribute to the advantage of providing consistent and standard practices and methodologies, and a structure for generation and management of AI model documentation from various collaborative sources.

Figure 11:
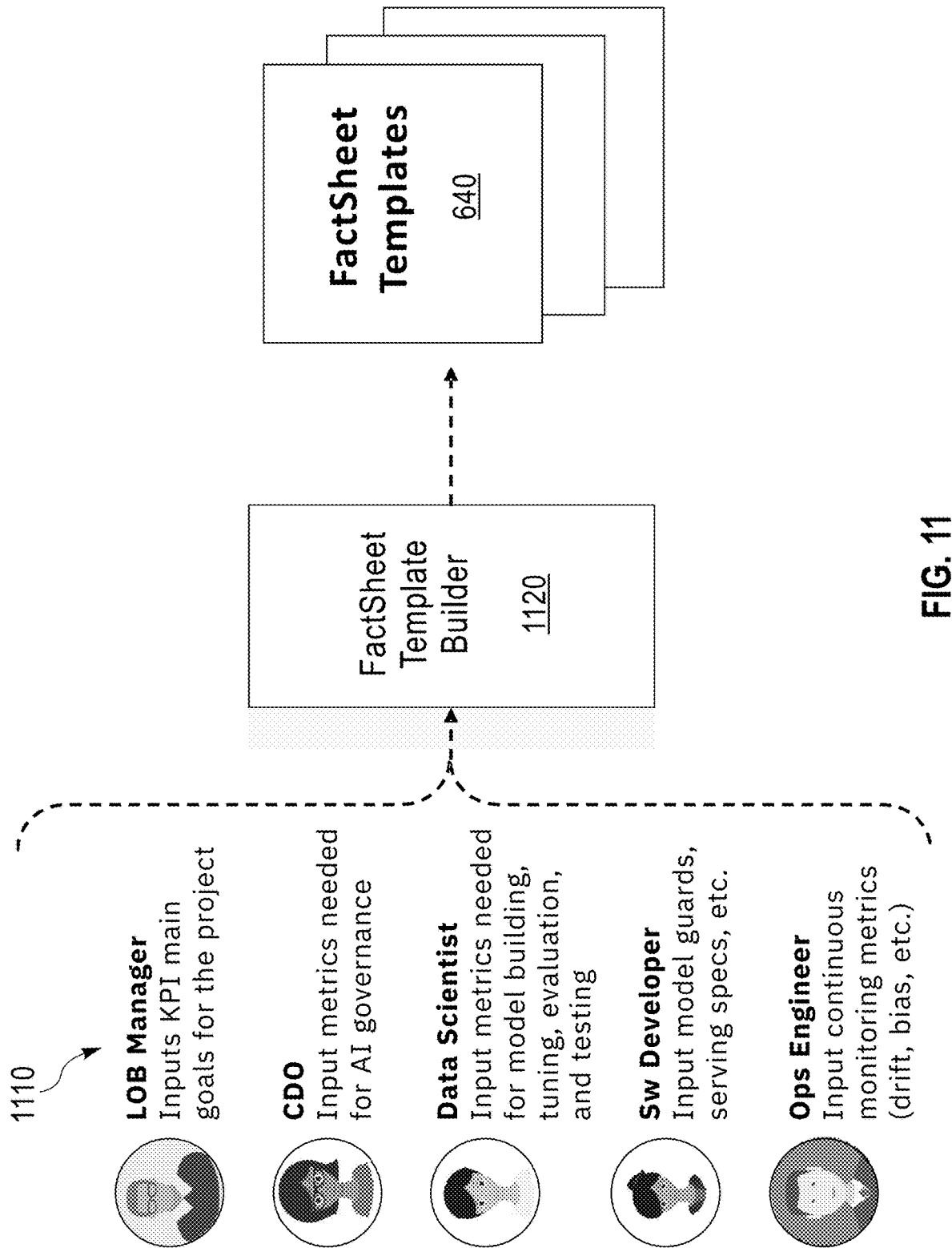
FIG. 11 illustrates a flow diagram for a factsheet template builder, according to one embodiment.

In one embodiment, the factsheet template 640 defines which model facts 620 are included in a factsheet 650 (typically based on stakeholder needs and access levels), their order, and their formatting. A factsheet template 640 is assembled from the factsheet palette 630 using tools such as a factsheet template builder 1120 (FIG. 11). The model facts policy 610 specifies the superset for all the facts that can be incorporated into factsheet templates 640. A factsheet template 640 specifies the subset of model facts 620, their order, and their styling, within an associated factsheet 650. A factsheet template 640 (and/or model facts policy 610 element) can optionally define constraints and associated event triggers (e.g., "production model accuracy needs to be >85%"; "security score >95%"; "fairness >90%", etc.). FIG. 7 illustrates an example factsheet template 641 for a credit risk use case, according to one embodiment. In one embodiment, any given stakeholder might be interested in and only able to see various sets of model facts 620. For example a data scientist might be interested in model metrics, a business owner might be interested in business KPIs and how they relate to the model metrics. Each stakeholder might see only one kind of factsheet 620 as specified by an associated factsheet template 640. Alternatively, a master factsheet 650 might have all model facts 620 but with exposure to only a subset of those facts as determined by stakeholder needs and access rights. The features regarding the factsheet template 640 contribute to the advantage of providing consistent and standard practices and methodologies, and a structure for generation and management of AI model documentation from various collaborative sources. Other advantages include providing a consistent process for documenting an AI system, an AI application and AI models during multiple stages in the life cycle of building AI models and applications.

Returning to FIG. 6, in one embodiment, the factsheet template 640 is used to generate a factsheet 650. A factsheet 650 is a generated, typically human-readable, set of model facts as specified by a factsheet template 640. A factsheet 650 can, and generally is, updated across the lifecycle of the AI model or application (e.g., when the AI model or application is built, updated, deployed in production, improved, etc.). In some embodiments, not all of these elements (model facts policy 610, model facts 620, factsheet palette 630, factsheet template 640, and factsheet 650) need to be explicitly present. Some of these elements may also be functionally combined. For example, the factsheet palette 630 may take on the role of the model facts policy 610.

In one embodiment, each AI model's set of facts can be rendered as a factsheet 650 as determined by the factsheet template 640. Each factsheet 650 is a document/report/view that describes various metrics, facts, and information about the AI model throughout its lifecycle. An AI application may be comprised of one of more AI models. A factsheet 650 may be associated with an AI application or individual AI models as needed. One or more AI models are deployed into an AI application that is associated with a factsheet 650, which is aggregated from the factsheets 650 of each AI model within the AI application. In one embodiment, a factsheet 650 describes information about an AI model independent of its use in any particular application. In another embodiment, an application factsheet 650 describes information about an application that uses one or more AI models.

In one embodiment, the items are grouped into several categories. The categories may include: why/when/how an AI model is built, when the AI model is updated, performance of the AI model in production, etc. These categories may also cover various aspects of AI model development, testing, deployment and maintenance: from information about the data the AI model is trained on, to underlying algorithms, test setup, test results, and performance benchmarks, to the way the AI model is maintained and retrained (including automatic adaptation).

In one embodiment, the factsheet 650 information items are devised to aid the user in understanding how the AI model or application works. The identified items are not intended to be definitive. If a question is not applicable to a given AI model or application, it can simply be ignored. More consequential applications will likely require more comprehensive completion of items. A few examples of items a factsheet 650 might include are: What is the intended use of the AI model or application output? What algorithms or techniques does this AI model or application implement? Which datasets was the AI model or application tested on? (Provide links to datasets that were used for testing, along with corresponding datasheets.) Describe the testing methodology. Describe the test results. Are you aware of possible examples of bias, ethical issues, or other safety risks as a result of using the AI model or application? Are the AI model or application outputs explainable and/or interpretable? What is the expected performance on unseen data or data with different distributions? When was the AI model or application last updated?, etc.

In one embodiment, a factsheet 650 is created once and associated with a AI model or application, but can continually be augmented, without removing previous information, i.e., results are added from more tests/training. In some embodiments, results cannot be removed from a factsheet 650. Any changes made to the AI model or application will prompt the creation of a new version of the factsheet 650 for the new AI model or application. Thus, these factsheets 650 are treated as a series of immutable artifacts. This information has the advantage that it can be used to more accurately monitor a deployed AI model or application by comparing deployed metrics with those that were seen during development and taking appropriate action when unexpected behavior is detected. FIG. 8 illustrates an example factsheet 651 for a credit risk use case, according to one embodiment. The factsheet 651 is generated using a set of model facts 620 as specified by the example factsheet template 641 (FIG. 7).

In one embodiment, the generation and management of AI model documentation processing (e.g., using a computing device, processor, server, etc. from computing node 10, FIG. 1, hardware and software layer 60, FIG. 2, processing system 300, FIG. 3, system 400, FIG. 4, system 500, FIG. 5, etc.) includes the advantages of creating policies (model facts policy 610, FIG. 6) that define the data/model/application facts to be collected, collecting the facts about an AI model or system (model facts 620) as determined by the model facts policy 610, creating factsheet templates 640 from a factsheet palette 630 and generating factsheets 650 from these factsheet templates 640, and utilizing a factsheet infrastructure to manage model facts policies 610, factsheet palettes 630, and factsheet templates 640, and to populate factsheets 650. These features contribute to the advantage of providing consistent and standard practices and methodologies, and a structure for generation and management of AI model documentation from various collaborative sources. Other advantages further include providing a consistent process for documenting an AI system, an AI application and AI models during multiple stages in the life cycle of building AI models and applications.

In one embodiment, a factsheet fabric (infrastructure) provides the means to collect, store, and manage model facts policies 610, model facts 620, factsheet palettes 630, factsheet templates 640, and factsheets 650 for various AI models and applications throughout the life cycle. In one embodiment, a factsheet fabric provides various utilities, for example: view: see/print a factsheet 650, archive: create a read only snapshot of a factsheet 650 at a given point in time, compare: compare two or more factsheets 650 in order to understand differences between AI models, ensemble: group two or more factsheets 650 into one when an AI model is composed from various AI models, search: find a factsheet 650 (and associated AI model) given various attributes: model identification (ID), template ID, model type, model deployment features, etc.

In one embodiment, the factsheet 650 may be applicable to at least, but not limited to, the following use cases and their advantages: documentation: factsheets 650 may be employed for auto-documenting for AI models and applications; transparency: factsheets 650 may be used for providing key information for model/service consumers to increase their trust; certification: factsheets 650 may be used for providing a standard mechanism for verification and certification of AI services/applications by third party organizations/authorities; compliance: factsheets 650 may be used for providing a standard way to prove compliance of an AI service with respect to some defined criteria; safety: factsheets 650 may be used for providing a standard way to get assurances of an AI Service's prescribed operating behavior; search: factsheets 650 may be used for providing a standard way to search for an AI Service, etc.

Figure 9:
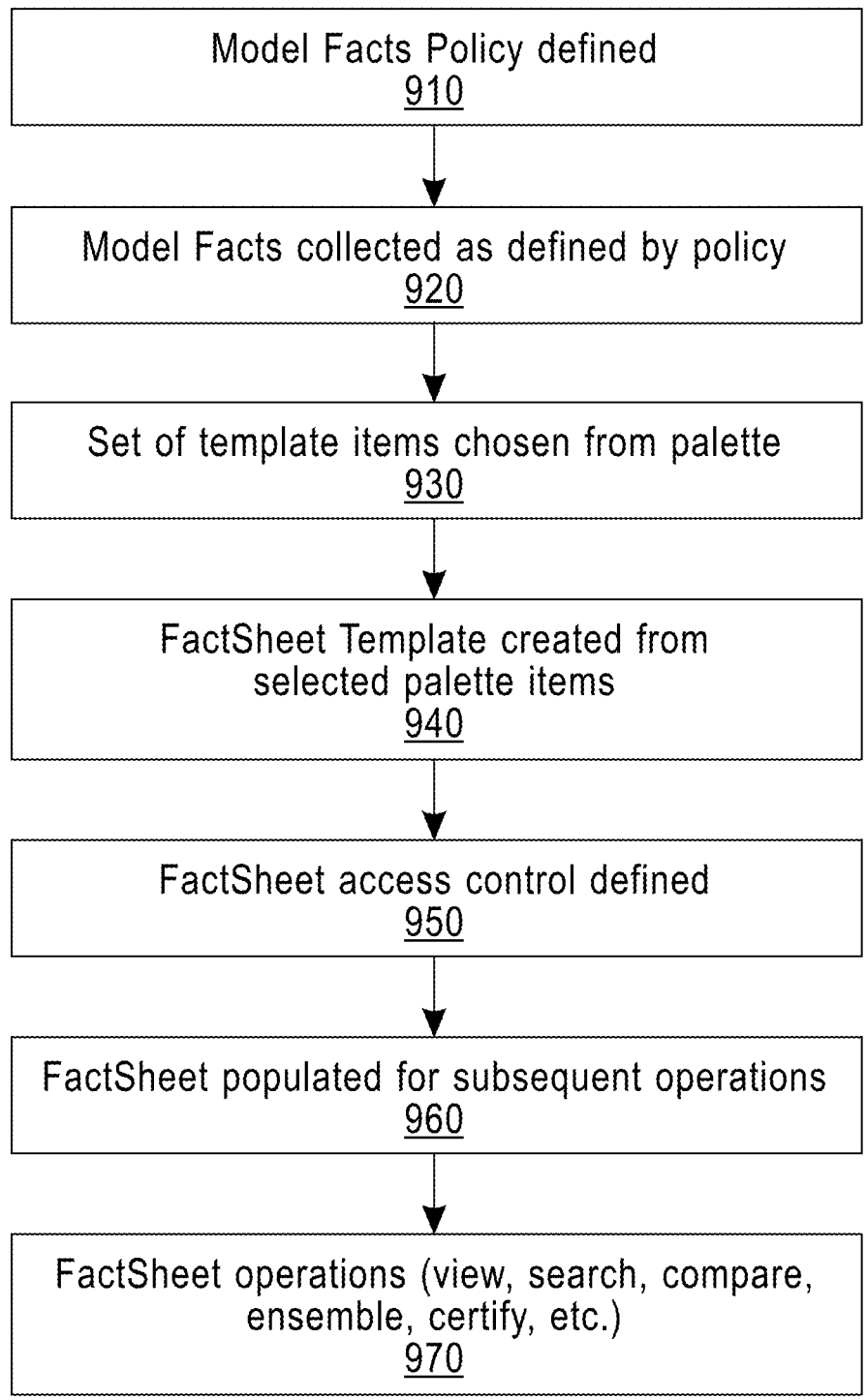
FIG. 9 illustrates typical processing actions for generation and management of AI model documentation, according to one embodiment.

FIG. 9 illustrates typical processing actions 900 for generation and management of AI model documentation, according to one embodiment. In one embodiment, the core actions include: model facts policy 610 (FIG. 6) defined 910, model facts 650 collected as defined by policy (model facts policy 610) 920 and factsheet 650 populated for subsequent operations 960. In one embodiment, the template actions include: the set of template (factsheet template 640) items chosen from palette (factsheet palette 630) 930, and the factsheet template 640 created from selected palette items 940. The factsheet operations (e.g., view, search, compare, compose, certify, etc.) 970 are factsheet 650 usage actions. In one embodiment, the factsheet access control defined 950 action may be employed for controlling the access (e.g., different tiers of authorization, permissions, etc.).

Figure 10:
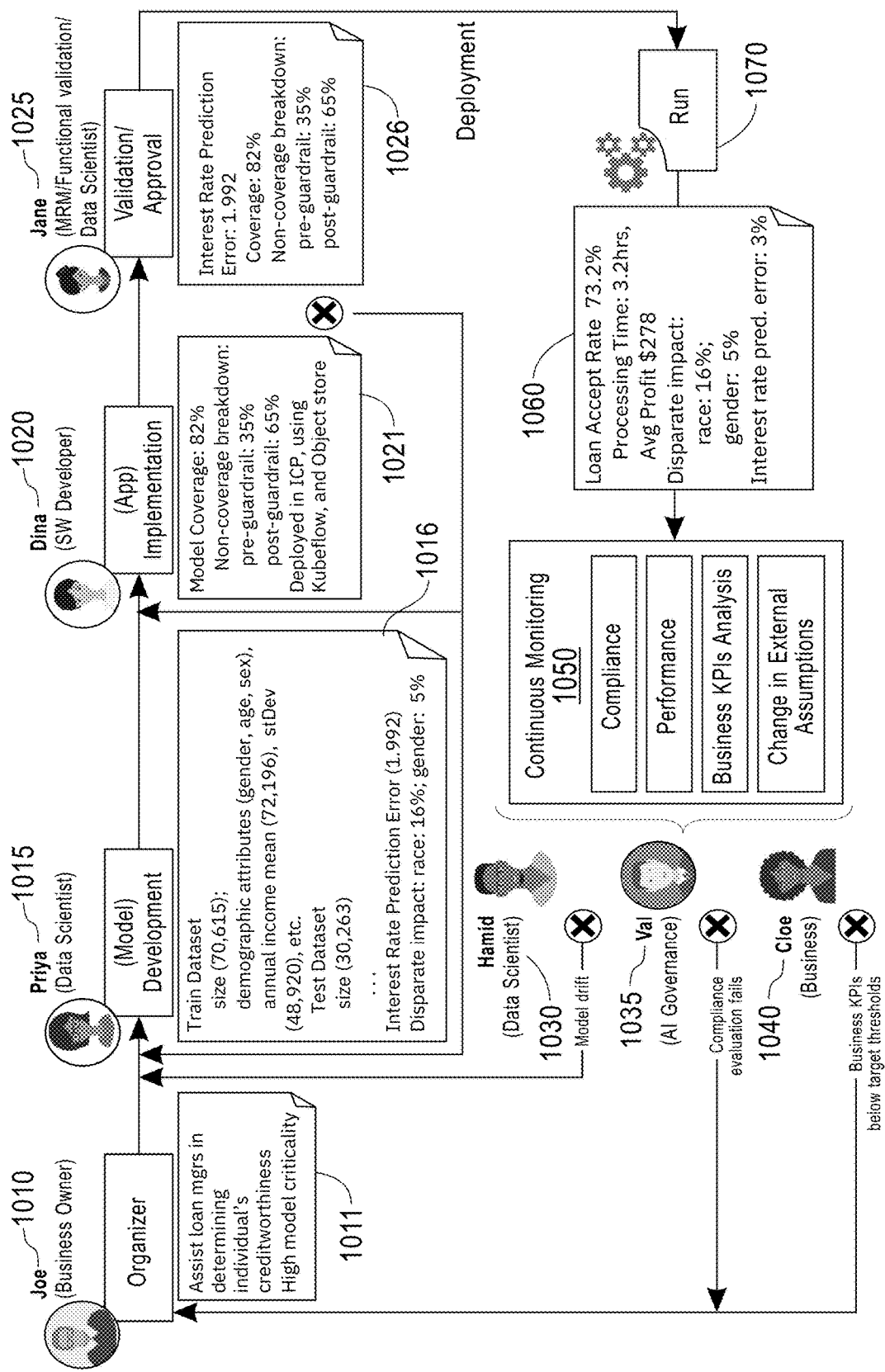
FIG. 10 illustrates facts that are collected and generated during an AI model or application life cycle, according to one embodiment.

FIG. 10 illustrates facts that are collected and generated during an example AI model or application life cycle, according to one embodiment. At each stage of the workflow, model metrics are automatically computed using various platforms and are collected through various application programming interface (API) calls or publisher/subscriber (pub/sub) mechanisms, etc., into the factsheet processing system. Example platforms include but are not limited to: data engineering (e.g., IBM® data refinery, INFOWORKS® DataFoundry, AZURE® SQL Data Warehouse, AZURE® DATABRICKS® and AZURE® Data Factory, etc.), model building (e.g., IBM WATSON® studio, H2O, AZURE® ML studio, etc.), model testing (e.g., AIF 360), model deployment (e.g., IBM WATSON® ML, AMAZON SAGEMAKER®, AZURE ML service, etc.), and model monitoring (e.g., IBM WATSON® Open Scale). These features contribute to the advantage of providing consistent and standard practices and methodologies, and a structure for generation and management of AI model documentation from various collaborative sources. Other advantages include providing a consistent process for automatic documenting of an AI system, an AI application and AI models during multiple stages in the life cycle of building AI models and applications.

In one embodiment, for the example life cycle, the parties involved are Joe 1010 (business owner), Priya 1015 (data scientist), Dina 1020 (software (SW) developer), Jane 1025 (messaging records management (MRM)/functional validation data scientist), Hamid 1030 (data scientist), Val 1035 (AI governance) and Cloe 1040 (business analyst). In one example embodiment, Joe 1010 provides origination of the model life cycle by action 1011 that specifies the intended use of the model to be assisting loan managers in determining an individual's credit worthiness, which has high model criticality. Priya 1015 provides model development and provides action 1016 that includes training a dataset including information such as the size (e.g., 70,615 data points), demographic attributes (e.g., gender, age, sex, etc.), annual income mean (e.g., $72,196), standard deviation (e.g., $48, 920), etc., the test dataset including information (e.g., size, demographic attributes, etc.), interest rate prediction error, disparate impact, etc. Dina 1020 provides application implementation and provides action 1021 that includes information such as model coverage (e.g., 82%) with non-coverage breakdown (e.g., pre-guardrail (e.g., 35%), post-guardrail (e.g., 65%)), and model deployment setting information. Jane 1025 provides action 1026 that includes information such as interest rate prediction error (e.g., 1.992), coverage (e.g., 82%), non-coverage breakdown (e.g., pre-guardrail (e.g., 35%), post-guradrail (e.g., 65%)).

In one example embodiment, the AI model is deployed and is run 1070, which generates information 1060 that may include information, such as loan acceptance rate (e.g., 73.2%), processing time (e.g., 3.2 hours), average profit (e.g., $278), disparate impact (e.g., race (e.g., 16%), gender (e.g., 5%)), and interest rate prediction error (e.g., 3%). Continuous monitoring 1050 of the AI model or application includes actions such as compliance (checking), performance, business KPIs analysis, change in external assumptions, etc. The information from the continuous monitoring 1050 is provided or obtained by Hamid 1030 who provides information on model drift, Val 1035 who provides information regarding compliance evaluation failures, and Cloe 1040 who provides information regarding business KPIs being below target thresholds. In one example embodiment, the life cycle processing continuously cycles, which provides updated information available for generating factsheets 650 (FIG. 6).

FIG. 11 illustrates a flow diagram for a factsheet template builder 1120, according to one embodiment. In one example embodiment, the factsheet template builder 1120 receives or obtains information from sources 1110. In one example, the sources 1110 include a line-of-business (LOB) manager that inputs main KPI goals for the project, the chief data officer (CDO) that inputs metrics needed for AI governance, a data scientist that inputs metrics needed for model building, tuning, evaluation and testing, a SW developer that inputs model guards, serving specifications, etc., and an operations (Ops) engineer that inputs continuous monitoring metrics (e.g., drift, bias, etc.).

In one embodiment, the factsheet template builder 1120 builds the factsheet templates 640 using the information from sources 1110 that is collected or obtained using the model facts policy 610 (FIG. 6) that guides the model facts 620 and using the factsheet palette 630. The features regarding the factsheet template builder 1120 contribute to the advantage of providing consistent and standard practices and methodologies, and a structure for generation and management of AI model documentation from various collaborative sources for generation of factsheet templates 640. Other advantages include providing a consistent process for automatic documenting of an AI system, an AI application and AI models during multiple stages in the life cycle of building AI models and applications.

Figure 12:
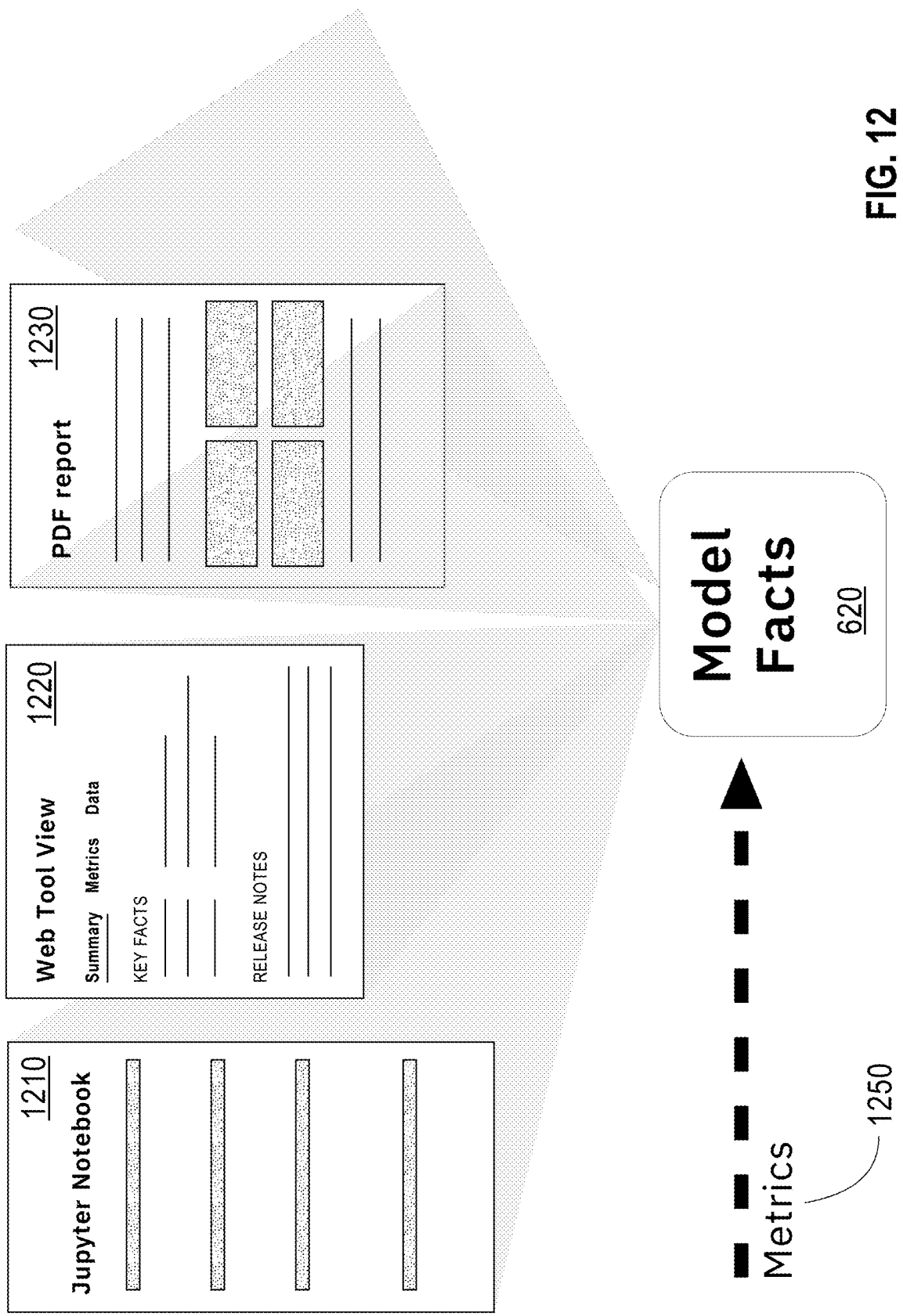
FIG. 12 illustrates different example factsheet views for different purposes, according to one embodiment.

FIG. 12 illustrates different example factsheet views for different purposes, according to one embodiment. In one embodiment, the generation and management of AI model documentation processing provides an associated set of utilities that allow various operations on the factsheets 650 such as view, print, search, ensemble, compare, and archive. In one example embodiment, the different views that are generated may include, but are not limited to the following: JUPYTER® Notebook 1210, Web Tool including a standard Web browser 1220, PDF report 1230, and other custom use/domain presentation 1240. The metrics 1250 are generated automatically throughout the life cycle of the AI model/service/application (e.g., through API calls, pub/sub mechanisms, etc.). These features contribute to the advantage of providing consistent and standard practices and methodologies, and a structure for generation and management of AI model documentation from various collaborative sources during the life cycle of an AI model and application. Other advantages include providing a consistent process for automatic documenting of an AI system, an AI application and AI models during multiple stages in the life cycle of building AI models and applications.

Figure 13:
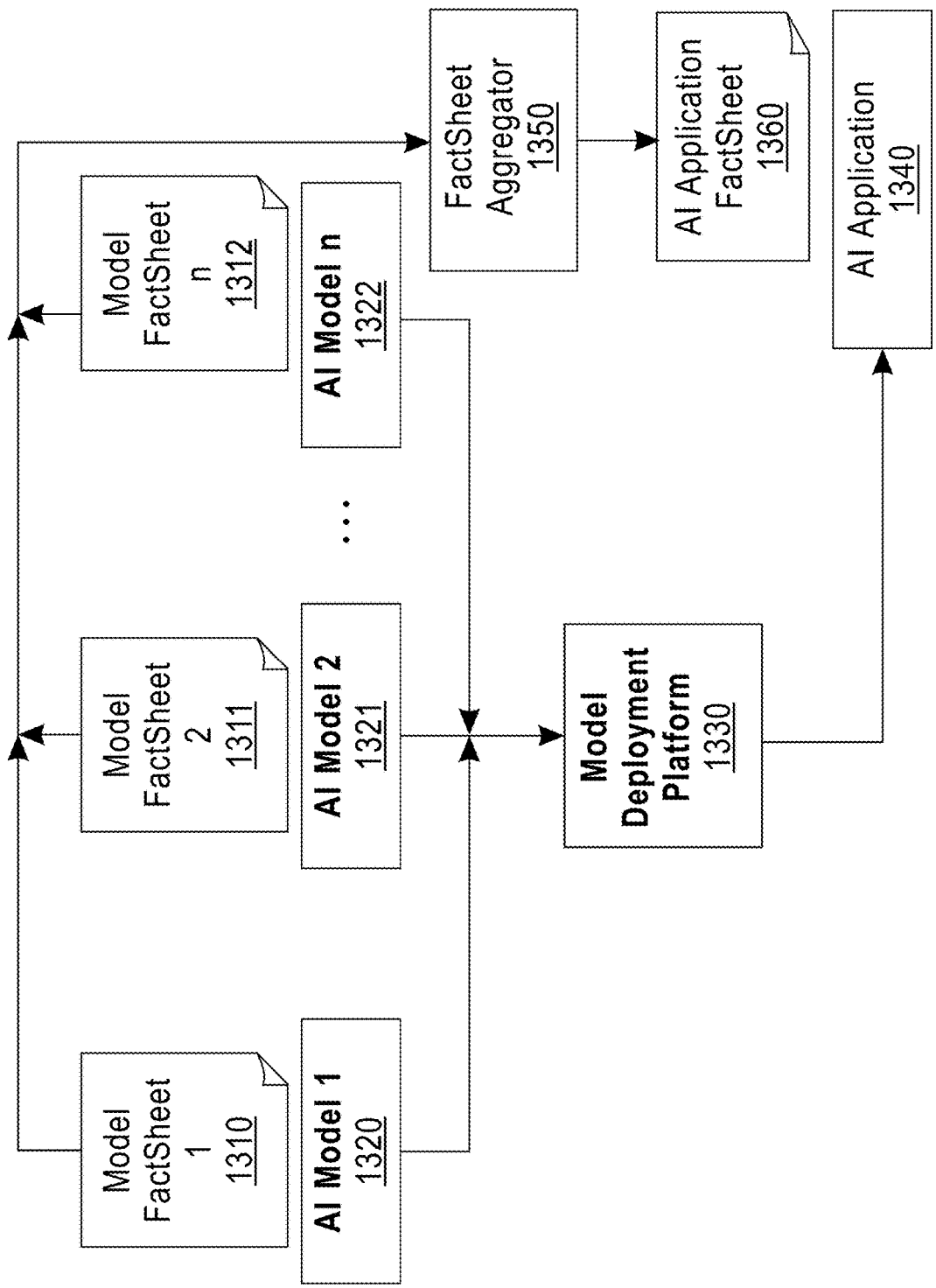
FIG. 13 illustrates a block diagram of an example model deployment platform with generation and management of AI model documentation, according to one embodiment.

FIG. 13 illustrates a block diagram of an example model deployment environment 1300 with generation and management of AI models and their associated documentation processing, according to one embodiment. In one embodiment, the example model deployment environment 1300 includes multiple AI models: AI model 1 1320, AI model 2 1321 through AI model n 1322. A factsheet (e.g., factsheet 650, FIG. 6) is generated (as described above) for each of the AI models: model factsheet 1 1310, model factsheet 2 1311 through model factsheet n 1312. In one embodiment, model deployment platform 1330 combines the models selected or chosen for inclusion in the AI Application 1340. The selection or choice is dependent on the usage, developer/designer requests, selection, etc. The factsheets aggregator 1350 aggregates the model factsheets dependent on the AI models included in the AI Application 1340. The aggregated factsheets are used to generate an AI Application factsheet 1360.

In one embodiment, the AI application factsheet 1360 is similar to the factsheet 650 (FIG. 6) but includes information regarding all of the AI models included in the AI Application 1340. In one embodiment, the AI Application factsheet 1360 includes the information regarding the separate AI models included in the AI Application 1340, and also includes information specific to the AI Application 1340.

Figure 14:
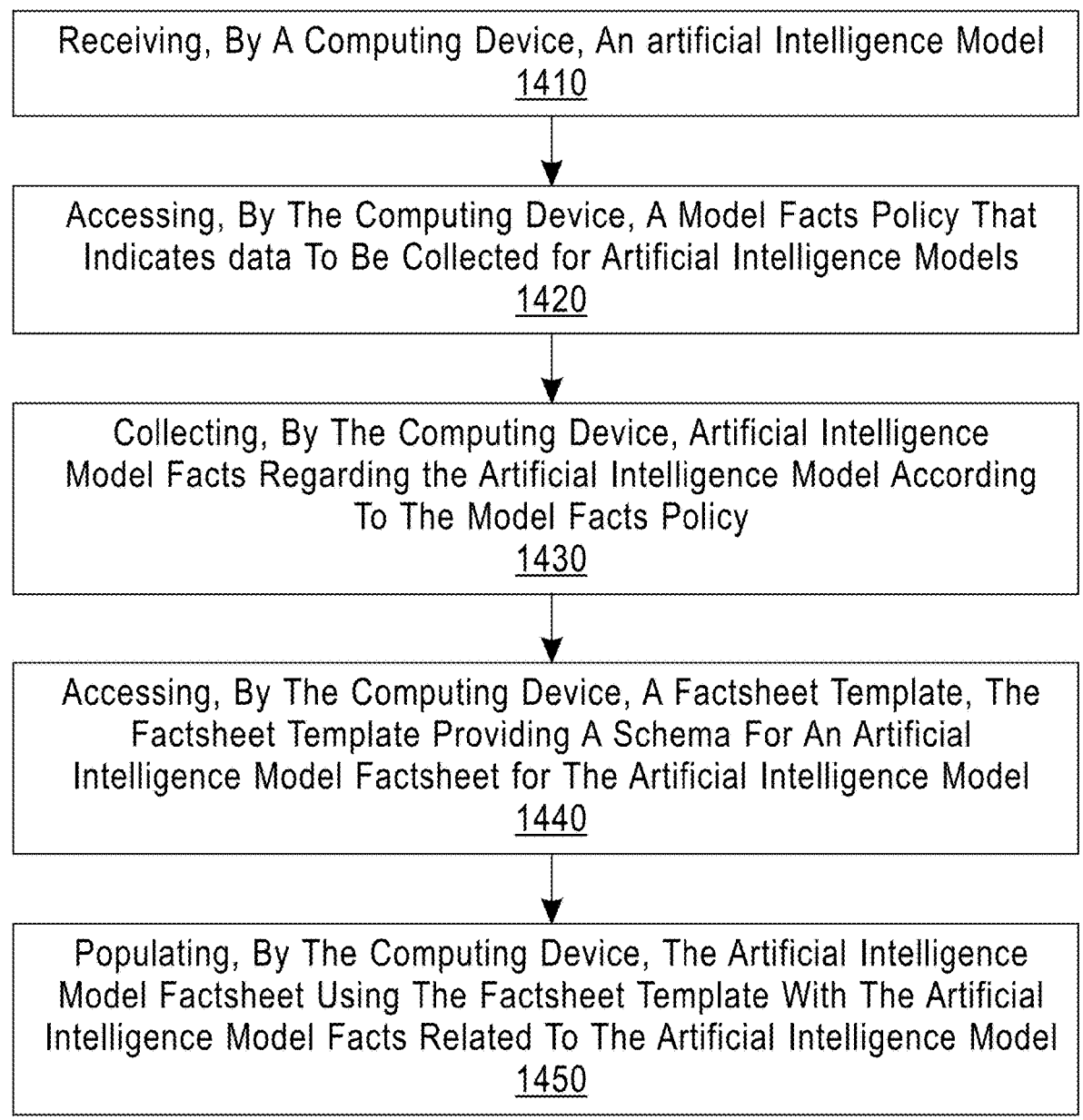
FIG. 14 illustrates a block diagram of a process for generation (and management) of AI model documentation, according to one embodiment.

FIG. 14 illustrates a block diagram of a process 1400 for automatic generation (and management) of AI model documentation, according to one embodiment. In one embodiment, in block 1410 process 1400 utilizes a computing device (from computing node 10, FIG. 1, hardware and software layer 60, FIG. 2, processing system 300, FIG. 3, system 400, FIG. 4, system 500, FIG. 5, etc.) to receive an AI model(s) (e.g., from a collaborator, from a repository, etc.). In block 1420, process 1400 accesses, by the computing device, a model facts policy (e.g., model facts policy 610, FIG. 6) that indicates data to be collected for AI models. In block 1430, process 1400 collects (or receives, obtains, etc.), by the computing device, AI model facts (e.g., model facts 620) regarding the artificial intelligence model according to the model facts policy. In block 1440, process 1400 accesses, by the computing device, a factsheet template (e.g., factsheet template 640). In one embodiment, the factsheet template provides a schema for an AI model factsheet (e.g., factsheet 650) for the AI model. In block 1450, process 1400 populates, by the computing device, the AI model factsheet using the factsheet template with the AI model facts related to the AI model.

In some embodiments, process 1400 may include the feature that the AI model is present within an AI application (e.g., software, hardware, firmware, etc.).

In some embodiments, process 1400 may include the feature that the indicated data of the model facts policy specifies the AI model facts that are collected as the AI model is being built, tested, deployed, and monitored in a machine learning workflow.

In some embodiments, process 1400 may include the feature that the AI model facts are generated from tasks in the machine learning workflow. This feature contributes to the advantage of providing a structure for generation and management of AI model documentation from various collaborative sources during the life cycle of an AI model and application. Other advantages include providing a consistent process for automatic documenting of an AI system, an AI application and AI models during multiple stages in the life cycle of building AI models and applications.

In some embodiments, process 1400 may include the feature that the AI model facts include information about the data and transformations, training protocols, algorithmics and optimizations, model performance metrics, lineage, and information as to how the artificial intelligence model is being operated in production.

In some embodiments, process 1400 may additionally include the feature of accessing, by the computing device, a factsheet palette (e.g., factsheet palette 630, FIG. 6). The factsheet palette defining elements that are selectable and combinable into the factsheet template (e.g., factsheet template 640). The feature of the factsheet palette contributes to the advantage of providing a structure for generation and management of AI model documentation from various collaborative sources during the life cycle of an AI model and application. Other advantages include providing a consistent process for automatic documenting of an AI system, an AI application and AI models during multiple stages in the life cycle of building AI models and applications.

In some embodiments, a factsheet template builder builds the factsheet template using information from multiple sources that is collected using the AI model facts policy and the factsheet palette. The feature of the factsheet template builder contributes to the advantage of providing a structure for generation and management of AI model documentation from various collaborative sources during the life cycle of an AI model and application. Other advantages include providing a consistent process for automatic documenting of an AI system, an AI application and AI models during multiple stages in the life cycle of building AI models and applications.

One or more embodiments may be a system, a method, and/or a computer program product at any possible technical detail level of integration. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device; an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the embodiments are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiment was chosen and described in order to best explain the principles of the embodiments and the practical application, and to enable others of ordinary skill in the art to understand the embodiments for various embodiments with various modifications as are suited to the particular use contemplated.

What is claimed is:

1. A method for automatically generating documentation for an artificial intelligence model, the method comprising:
   receiving, by a computing device, an artificial intelligence model into a memory device;
   reading, by the computing device, a model facts policy from the storage device, the model facts policy indicating data to be collected for artificial intelligence models;
   reading, by the computing device, artificial intelligence model facts from the storage device, the artificial intelligence model facts comprising information regarding the artificial intelligence model according to the model facts policy;
   reading, by the computing device, a factsheet template from the storage device, the factsheet template providing a schema for an electronically stored artificial intelligence model factsheet for the artificial intelligence model, and the factsheet template specifies a subset of the artificial intelligence model facts and their order; and storing, by the computing device, the artificial intelligence model facts related to the artificial intelligence model in the artificial intelligence model factsheet using the factsheet template.

2. The method of claim 1, wherein the artificial intelligence model is present within an artificial intelligence application, the artificial intelligence application comprises one or more artificial intelligence application models, and the factsheet is aggregated from factsheets of each artificial intelligence model within the artificial intelligence application.

3. The method of claim 1, wherein the indicated data of the model facts policy specifies the artificial intelligence model facts that are collected as the artificial intelligence model is being built, tested, deployed, and monitored in a machine learning workflow.

4. The method of claim 3, wherein the artificial intelligence model facts are generated from tasks in the machine learning workflow.

5. The method of claim 4, wherein the artificial intelligence model facts comprise information about the data and transformations, training protocols, algorithmics and optimizations, model performance metrics, lineage, and information as to how the artificial intelligence model is being operated in production.

6. The method of claim 1, further comprising:
accessing, by the computing device, a factsheet palette from the storage device, the factsheet palette defining elements that are selectable and combinable into the factsheet template;
wherein:
a factsheet is continually augmented, without removing previous information; and
any changes made to the artificial intelligence model prompts creation of a new version of the factsheet.

7. The method of claim 6, wherein a factsheet template builder builds the factsheet template using information from a plurality of sources that is collected using the artificial intelligence model facts policy and the factsheet palette.

8. A computer program product for automatically generating documentation for an artificial intelligence model, the computer program product comprising a computer readable storage medium having program instructions embodied therewith, the program instructions executable by a processor to cause the processor to:
receive, by the processor, an artificial intelligence model into a memory device;
read, by the processor, a model facts policy from the storage device, the model facts policy indicating data to be collected for artificial intelligence models;
read, by the processor, artificial intelligence model facts from the storage device, the artificial intelligence model facts comprising information regarding the artificial intelligence model according to the model facts policy;
read, by the processor, a factsheet template from the storage device, the factsheet template providing a schema for an electronically stored artificial intelligence model factsheet for the artificial intelligence model, and the factsheet template specifies a subset of the artificial intelligence model facts and their order; and
store, by the processor the artificial intelligence model facts related to the artificial intelligence model in the artificial intelligence model factsheet using the factsheet template.

9. The computer program product of claim 8, wherein the artificial intelligence model is present within an artificial intelligence application, the artificial intelligence application comprises one or more artificial intelligence application models, and the factsheet is aggregated from factsheets of each artificial intelligence model within the artificial intelligence application.

10. The computer program product of claim 8, wherein the indicated data of the model facts policy specifies the artificial intelligence model facts that are collected as the artificial intelligence model is being built, tested, deployed, and monitored in a machine learning workflow.

11. The computer program product of claim 10, wherein the artificial intelligence model facts are generated from tasks in the machine learning workflow.

12. The computer program product of claim 11, wherein the artificial intelligence model facts comprise information about the data and transformations, training protocols, algorithmics and optimizations, model performance metrics, lineage, and information as to how the artificial intelligence model is being operated in production.

13. The computer program product of claim 12, wherein:
the program instructions executable by the processor further cause the processor to:
access, by the processor, a factsheet palette from the storage device, the factsheet palette defining elements that are selectable and combinable into the factsheet template;
a factsheet is continually augmented, without removing previous information; and
any changes made to the artificial intelligence model prompts creation of a new version of the factsheet.

14. The computer program product of claim 13, wherein a factsheet template builder builds the factsheet template using information from a plurality of sources that is collected using the artificial intelligence model facts policy and the factsheet palette.

15. An apparatus comprising:
a memory configured to store instructions; and
a processor configured to execute the instructions to:
receive an artificial intelligence model into the memory;
read a model facts policy from the memory, the model facts policy indicating data to be collected for artificial intelligence models;
read artificial intelligence model facts from the memory, the artificial intelligence model facts comprising information regarding the artificial intelligence model according to the model facts policy;
read a factsheet template from the memory, the factsheet template providing a schema for an electronically stored artificial intelligence model factsheet for the artificial intelligence model, and the factsheet template specifies a subset of the artificial intelligence model facts and their order; and
store the artificial intelligence model facts related to the artificial intelligence model in the artificial intelligence model factsheet using the factsheet template.

16. The apparatus of claim 15, wherein the artificial intelligence model is present within an artificial intelligence application, the artificial intelligence application comprises one or more artificial intelligence application models, the factsheet is aggregated from factsheets of each artificial intelligence model within the artificial intelligence application, and the indicated data of the model facts policy specifies the artificial intelligence model facts that are collected as the artificial intelligence model is being built, tested, deployed, and monitored in a machine learning workflow.

17. The apparatus of claim 16, wherein the artificial intelligence model facts are generated from tasks in the machine learning workflow.

18. The apparatus of claim 17, wherein the artificial intelligence model facts comprise information about the data and transformations, training protocols, algorithmics and optimizations, model performance metrics, lineage, and information as to how the artificial intelligence model is being operated in production.

19. The apparatus of claim 15 wherein:
the processor is further configured to execute the instructions to:
  access a factsheet palette from the memory, the factsheet palette defining elements that are selectable and combinable into the factsheet template;
a factsheet is continually augmented, without removing previous information; and
any changes made to the artificial intelligence model prompts creation of a new version of the factsheet.

20. The apparatus of claim 19, wherein a factsheet template builder builds the factsheet template using information from a plurality of sources that is collected using the artificial intelligence model facts policy and the factsheet palette.

* * * * *